(12) United States Patent
Busch et al.

(10) Patent No.: US 8,885,367 B2
(45) Date of Patent: Nov. 11, 2014

(54) INPUT CIRCUIT FOR AN ELECTRICAL DEVICE, USE OF AN INPUT CIRCUIT AND ELECTRICAL DEVICE

(75) Inventors: Peter Busch, Augsburg (DE); Robert Ruef, Friedberg (DE)

(73) Assignee: Fujitsu Technology Solutions Intellectual Property GmbH (DE)

( * ) Notice: Subject to any disclaimer, the term of this patent is extended or adjusted under 35 U.S.C. 154(b) by 128 days.

(21) Appl. No.: 13/369,443

(22) Filed: Feb. 9, 2012

(65) Prior Publication Data

US 2012/0163056 A1    Jun. 28, 2012

Related U.S. Application Data

(63) Continuation of application No. PCT/EP2010/061050, filed on Jul. 29, 2010.

(30) Foreign Application Priority Data

Aug. 18, 2009 (DE) .......................... 10 2009 037 859

(51) Int. Cl.
*H02M 1/12* (2006.01)
*H02M 1/42* (2007.01)
*H02M 1/00* (2006.01)

(52) U.S. Cl.
CPC ............ *H02M 1/126* (2013.01); *H02M 1/4225* (2013.01); *H02M 2001/0032* (2013.01); *H02M 2001/0064* (2013.01); *Y02B 70/126* (2013.01); *Y02B 70/16* (2013.01)
USPC .......................................................... 363/39

(58) Field of Classification Search
CPC .................................. H02M 1/126; H02J 3/38
USPC ................... 363/89, 125–128, 37; 307/43, 75
See application file for complete search history.

(56) References Cited

U.S. PATENT DOCUMENTS 3,569,826 A    3/1971 Burnett
5,466,998 A *  11/1995 Kinoshita et al. ............. 318/375
(Continued)

FOREIGN PATENT DOCUMENTS

DE    30 28 986        3/1982
DE    30 45 715 A1    6/1982
(Continued)

OTHER PUBLICATIONS

VDE-Norm "Einrichtungen der Informationstechnik—Sicherheit," DIN EN 60950-1 (International Norm IEC 60950-1), English summary.

(Continued)

*Primary Examiner* — Adolf Berhane
*Assistant Examiner* — Jye-June Lee
(74) *Attorney, Agent, or Firm* — DLA Piper LLP (US)

(57) ABSTRACT

A switched-mode power supply unit includes a mains input connecting the power supply to a primary supply voltage; an input circuit including a shared electrical path connected to the mains input and including a first mains filter, a first electrical path, connected in series with the shared electrical path, including a second mains filter, a second electrical path connected in series with the shared electrical path and connected in parallel with the first electrical path, and a first switching element that opens the first electrical path; a supply output that provides a filtered primary supply voltage; a switched-mode converter coupled to the supply output that converts the filtered primary supply voltage to a secondary supply voltage; and a control circuit that selectively switches the power supply unit to a first mode of operation with a high power output or a second mode of operation with a reduced power output.

19 Claims, 7 Drawing Sheets

(56) References Cited

U.S. PATENT DOCUMENTS

| | | | |
|---|---|---|---|
| 5,650,924 A | 7/1997 | Huh | |
| 5,668,712 A | 9/1997 | Cassese et al. | |
| 5,777,866 A | 7/1998 | Jacobs et al. | |
| 5,994,889 A | 11/1999 | Goller et al. | |
| 6,031,749 A * | 2/2000 | Covington et al. | 363/98 |
| 6,316,844 B1 | 11/2001 | Arima | |
| 6,445,165 B1 * | 9/2002 | Malik et al. | 363/53 |
| 6,690,150 B2 | 2/2004 | Pelletier et al. | |
| 7,283,896 B2 | 10/2007 | Lin | |
| 7,531,917 B2 * | 5/2009 | Stone et al. | 307/64 |
| 7,667,988 B2 * | 2/2010 | Haeberle et al. | 363/39 |
| 2002/0012258 A1 | 1/2002 | Nagai et al. | |
| 2002/0012261 A1 | 1/2002 | Moindron | |
| 2002/0190797 A1 | 12/2002 | Deppe et al. | |
| 2003/0202296 A1 | 10/2003 | Hamano et al. | |
| 2003/0218838 A1 | 11/2003 | Poulsen | |
| 2005/0254267 A1 | 11/2005 | Turvey | |
| 2006/0139965 A1 | 6/2006 | Gan et al. | |
| 2007/0103001 A1 * | 5/2007 | Chiozzi et al. | 307/10.1 |
| 2007/0226694 A1 | 9/2007 | Neufeld et al. | |
| 2007/0291522 A1 | 12/2007 | Toba et al. | |
| 2008/0084718 A1 | 4/2008 | Ingman | |

FOREIGN PATENT DOCUMENTS

| | | |
|---|---|---|
| DE | 43 27 665 | 2/1995 |
| DE | 101 06 132 A1 | 8/2002 |
| DE | 10 2005 049 909 A1 | 7/2006 |
| EP | 0 179 982 | 5/1986 |
| EP | 1 176 688 A1 | 1/2002 |
| EP | 1 783 887 A1 | 5/2007 |
| JP | 58-212369 A | 12/1983 |
| JP | 61-4418 | 1/1986 |
| JP | 62-233815 A | 10/1987 |
| JP | 2-133808 A | 5/1990 |
| JP | 3-198661 | 8/1991 |
| JP | 3-126396 | 12/1991 |
| JP | 05-316723 | 11/1993 |
| JP | 06-339692 | 12/1994 |
| JP | 07-241077 | 9/1995 |
| JP | 08-066008 | 3/1996 |
| JP | 8-308236 A | 11/1996 |
| JP | 09-140138 | 5/1997 |
| JP | 2002-010492 A | 1/2002 |
| JP | 2002010492 A * | 1/2002 |
| JP | 2003-018842 | 1/2003 |
| JP | 2003-338722 | 11/2003 |
| JP | 2004-72846 | 3/2004 |
| JP | 2004-147409 | 5/2004 |
| JP | 2005-210809 A | 8/2005 |
| JP | 2006-94580 | 4/2006 |
| JP | 2008-529159 | 7/2008 |
| JP | 2009-038848 | 2/2009 |
| JP | 2009-142002 | 6/2009 |
| WO | 2007/129469 | 11/2007 |

OTHER PUBLICATIONS

English translation of Japanese Notification of Reasons for Refusal dated Apr. 15, 2014 from corresponding Japanese Patent Application No. 2012-525118.

* cited by examiner

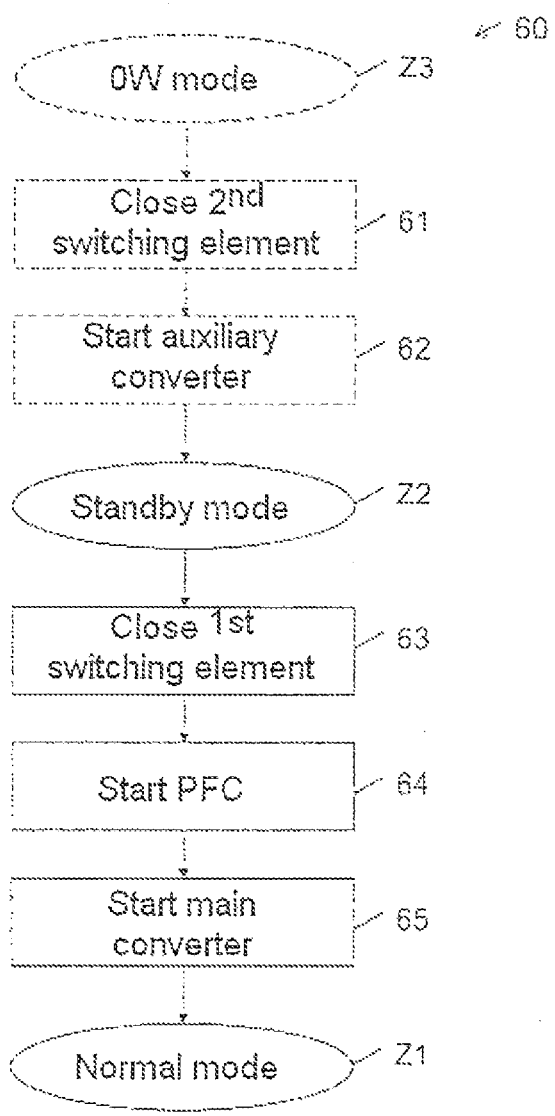

INPUT CIRCUIT FOR AN ELECTRICAL DEVICE, USE OF AN INPUT CIRCUIT AND ELECTRICAL DEVICE

RELATED APPLICATIONS

This is a continuation of International Application No. PCT/EP2010/061050, with an international filing date of Jul. 29, 2010 (WO 2011/020686, published Feb. 24, 2011), which is based on German Patent Application No. 10 2009 037 859.6, filed Aug. 18, 2009, the subject matter of which is incorporated by reference.

TECHNICAL FIELD

This disclosure relates to an input circuit for an electrical appliance having a mains filter, wherein the electrical appliance can be operated in a first mode of operation with a high power consumption and in a second mode of operation with a reduced power consumption. The disclosure also relates to the use of such an input circuit in a switched-mode power supply unit and an electrical appliance having such an input circuit.

BACKGROUND

Electrical appliances having mains filters and different power consumptions are widely known. Particularly information technology and consumer electronics appliances often have not only a normal, fully switched-on mode of operation, but also what is known as a standby mode of operation in which only a relatively low power is drawn from a power supply system. Such standby modes of operation allow, inter alia, electrical appliances to be put into a fully switched-on operating state again under remote or time control.

A drawback of such electrical appliances is that they always draw a low power from the power supply system even in the standby mode of operation. Furthermore, power supply units and their components used to supply power to the electrical appliance usually exhibit lower efficiency in the standby mode of operation than in the power range which is designed for normal operation.

An example of such a component is mains filters and circuits for power factor correction used particularly when powerful switched-mode power supply units are used to reduce voltage and current spikes which occur therein.

FIG. 2 shows a conventional arrangement comprising an input circuit 1 with a mains filter for an electrical appliance. The circuit arrangement 1 comprises a mains input 3 in the form of a phase input Line and a neutral conductor Neutral coupled to a rectifier circuit in the form of a bridge rectifier BD1 via a mains input filter. The mains input filter comprises X capacitors Cx1 and Cx2 arranged between the phase input Line and the neutral conductor Neutral, y capacitors Cy1, Cy2, Cy3 and Cy4 arranged between the phase connection Line or the neutral conductor Neutral and electrical ground, interference suppression coils L1 and L2 arranged in the phase line Line and the neutral conductor Neutral, respectively, and a discharge resistor Rx connected between the phase line Line and the neutral conductor Neutral. The bridge rectifier BD1 comprises four diodes arranged in what is known as a "Graetz bridge" and which convert an AC voltage on the connections 4 and 3 into a pulsating DC voltage on the connections 1 and 2. The actual power supply unit is not shown in FIG. 2. In the circuit arrangement 1 in FIG. 2, it has been connected in parallel with the storage capacitor denoted by Cb.

To avoid a large charging current when the power supply unit is switched on by the switch Sw in the phase line Line, the rectifier BD1 and the storage capacitor Cb have a current limiting element connected between them in the form of an NTC thermistor Rntc. The NTC thermistor limits the charging current in the capacitor Cb when the mains cable is switched on or plugged in. To avoid the parasitic load of the NTC thermistor Rntc during operation of the circuit arrangement 1, a monostable relay Rel is provided. By applying a voltage of twelve volts, for example, between the control connections A and B of the relay Rel, it is possible to short the current limiting element Rntc.

A drawback of the circuit arrangement 1 shown in FIG. 2 is that the mains input filter and storage capacitor Cb are always connected to the power supply system when the switch Sw is closed. Even if a power supply unit were therefore to draw no charge from the storage capacitor Cb, the mains input filter would result in an apparent power and power loss through the circuit arrangement 1. The discharge resistor Rx in the mains input filter also contributes to the power loss in the circuit arrangement 1. It is required for safety reasons to discharge the mains-side X capacitors Cx1 and Cx2 in the mains input filter which have a capacitance of more than 100 nF, for example, in a controlled fashion upon isolation from the mains. According to relevant specifications, for example, the VDE standard "Einrichtungen der Informationstechnik—Sicherheit" [Information technology devices—safety] DIN EN 60950-1, X capacitors in mains filters must be discharged to less than 37% of the starting value within a time of less than one second. Alternatively, the total capacitance of all X capacitors must be limited to a value of no more than 100 nF. This results in the efficiency of an electrical appliance being reduced particularly in a mode of operation with reduced power consumption.

It could therefore be helpful to provide an input circuit for an electrical appliance which improves the efficiency of the electrical appliance in an operating state with a reduced power consumption. In particular, it could be helpful to reduce the power loss from electrical mains filters or circuits for power factor correction present in the input circuit.

SUMMARY

We provide a switched-mode power supply unit including a mains input that connects the power supply to a primary supply voltage, an input circuit including a shared electrical path connected to the mains input and including a first mains filter, a first electrical path, connected in series with the shared electrical path, including a second mains filter, a second electrical path, connected in series with the shared electrical path and connected in parallel with the first electrical path, and a first switching element that opens the first electrical path, at least one supply output that provides a filtered primary supply voltage, at least one switched-mode converter coupled to the at least one supply output that converts the filtered primary supply voltage to a secondary supply voltage, and a control circuit that selectively switches the power supply unit to a first mode of operation with a high power output or a second mode of operation with a reduced power output in comparison with the first mode of operation, wherein the control circuit actuates the input circuit such that in the first mode of operation the first switching element is closed as a result of which an operating current is filtered by the first mains filter and the second mains filter, and in the second mode of operation the first switching element is open as a result of which the operating current is filtered only by the first mains filter.

We also provide an input circuit for an electrical appliance including a shared electrical path including a first mains filter, a first electrical path connected in series with the shared electrical path, including a second mains filter, a second electrical path connected in series with the shared electrical path and connected in parallel with the first electrical path, a first switching element that opens the first electrical path, and a control input that actuates the first switching element by a control circuit, wherein the first switching element is closed in a first mode of operation with a high power consumption for the electrical appliance as a result of which an operating current is filtered by the first mains filter and the second mains filter, and is open in a second mode of operation with a reduced power consumption for the electrical appliance in comparison with the first mode of operation as a result of which the operating current is filtered only by the first mains filter.

We further provide an electrical appliance including a mains input that connects the electrical appliance to a power supply system, an input circuit electrically coupled to the mains input, having the at least one first switching element, at least one switched-mode converter coupled to the input circuit to convert a first supply voltage to a second supply voltage, and a control circuit to selectively switch the electrical appliance to a first mode of operation with a high power consumption or a second mode of operation with a reduced power consumption in comparison with the first mode of operation, wherein the control circuit actuates the input circuit such that in the first mode of operation the first switching element is closed and in the second mode of operation the first switching element is open.

BRIEF DESCRIPTION OF THE DRAWINGS

FIG. 8 shows a combined state diagram and flowchart for alternation between different modes of operation of an electrical appliance.

LIST OF REFERENCE SYMBOLS

Figure 1:
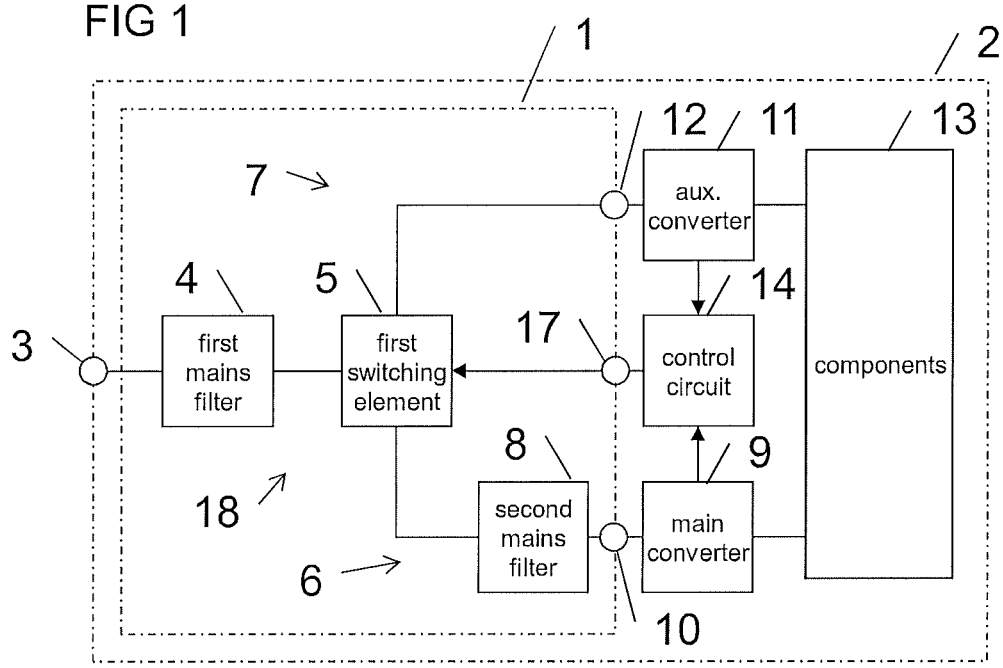
FIG. 1 shows a schematic illustration of an electrical appliance with an input circuit.
Figure 2:
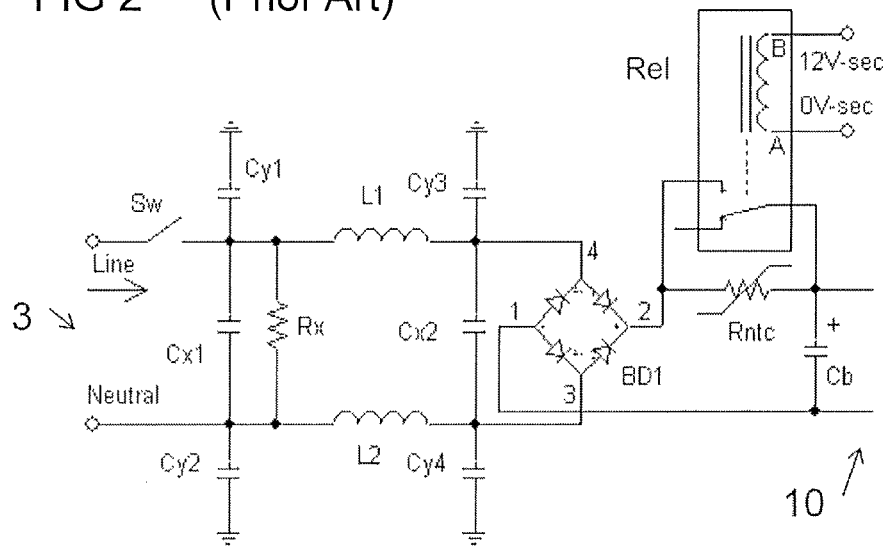
FIG. 2 shows a conventional input circuit for an electrical appliance.

1 Input circuit
2 Electrical appliance
3 Mains input
4 First mains filter
5 First switching element
6 First electrical path
7 Second electrical path
8 Second mains filter
9 Main converter
10 First supply output
11 Auxiliary converter
12 Second supply output
13 Component
14 Control circuit
15 PFC circuit
16 Control connection
17 Control input
18 Shared electrical path
19 Second switching element
20 Switching output
61-65 Method steps
Z1 First mode of operation (normal mode of operation)
Z2 Second mode of operation (standby mode of operation)
Z3 Third mode of operation (zero-watts mode of operation)

DETAILED DESCRIPTION

We provide an input circuit for an electrical appliance which comprises a shared electrical path comprising a first mains filter, a first electrical path, connected in series with the shared electrical path, comprising a second mains filter, and a second electrical path connected in series with the shared electrical path and connected in parallel with the first electrical path. We provide a first switching element to open the first electrical path and a control input to actuate the first switching element by a control circuit, wherein the first switching element is closed in a first mode of operation with a high power consumption for the electrical appliance, as a result of which an operating current is filtered by the first mains filter and the second mains filter, and the first switching element is open in a second mode of operation with a reduced power consumption for the electrical appliance in comparison with the first mode of operation, as a result of which the operating current is filtered only by the first mains filter.

Splitting a mains filter into a first mains filter and a second mains filter and the arrangement of the second mains filter in a first electrical path allows the second mains filter to be selectively connected by the first switching element in a first mode of operation with a high power consumption and allows the second mains filter to be bypassed by a second electrical path in a second mode of operation with a reduced power consumption. In this way, it is possible to select differently dimensioned mains filters for different modes of operation of the electrical appliance, with the first and second mains filters customized to suit the demands of the first and second modes of operation of the electrical appliance, as a result of which greater efficiency and, hence, lower power loss in the electrical appliance are achieved.

The first switching element may be in the form of a relay, particularly a monostable relay. The use of a relay as a switching element allows the second mains filter to be easily and safely isolated from the first electrical path of the input circuit and at the same time allows provision of a switching output, for example, for peripheral devices connected to the electrical appliance.

The second electrical path may contain a current limiting element. The arrangement of a current limiting element in the second electrical path prevents a switch-on current inrush when the input circuit is connected to a power supply system. In the first mode of operation with the high power consumption, the current limiting element can be shorted by the first electrical path, as a result of which no power loss occurs on the current limiting element in the first mode of operation.

The input circuit may comprise a second switching element to isolate the second electrical path. In this instance, the control circuit is set up to open both the first and the second switching element in a third mode of operation as a result of which the input circuit is not used to provide a voltage for the electrical appliance from a power supply system. The use of a second switching element to open the second electrical path too allows the electrical appliance to be isolated from a power supply system completely as a result of which no further electrical power at all is drawn from the power supply system. Particularly for such appliances as do not require a standby mode or as have an internal power source for electronically starting the electrical appliance again, it is thus possible to reduce the power consumption of the electrical appliance to zero.

The second switching element may be in the form of a semiconductor switching element, particularly a thyristor. The use of a semiconductor switching element allows the simple activation of the input circuit by an internal power source in the electrical appliance for the purpose of switching the electrical appliance to the second mode of operation.

The first mains filter may have no X capacitor or may have an X capacitor having a capacitance of no more than 100 nF, and the second mains filter may have an X capacitor having a capacitance of more than 100 nF. The use of a first mains filter without an X capacitor or with a relatively small X capacitor of less than 100 nF capacitance, for example, allows the use of what are known as "discharge resistors" to discharge the X capacitor in the first mains filter to be dispensed with. Hence, the first mains filter can be designed such that it does not cause a power loss even when the input circuit is continually connected to the power supply system.

The input circuit may comprise a circuit for power factor correction, and the control circuit is set up to activate the circuit for power factor correction in the first mode of operation and deactivate the circuit in the second mode of operation. The selective activation of a circuit for power factor correction allows the use of a simple, efficient circuit without power factor correction to supply power to the electrical appliance in the second mode of operation and the use of a particularly powerful circuit with requisite power factor correction in the first mode of operation.

The input circuit may have a first storage capacitor having a first capacitance and a second storage capacitor having a second capacitance which is lower than the first to buffer a supply voltage for the electrical appliance, wherein the first storage capacitor is arranged in the first electrical path. The use of different storage capacitors to buffer a supply voltage in the first or second mode of operation results in a further improvement in efficiency of the input circuit in the second mode of operation.

The described input circuits are particularly suitable for use in a switched-mode power supply unit, for example, supplying power to a consumer electronics or information technology appliance.

The electrical appliance may comprise a mains input to connect the electrical appliance to a power supply system, an input circuit, electrically coupled to the mains input, having at least one first switching element, and at least one switched-mode converter, coupled to the input circuit, to convert a first supply voltage to a second supply voltage. The electrical appliance may also comprise a control circuit to selectively switch the electrical appliance to a first mode of operation with a high power consumption or a second mode of operation with a reduced power consumption in comparison with the first mode of operation, wherein the control circuit is set up to actuate the input circuit such that in the first mode of operation the first switching element is closed and in the second mode of operation the first switching element is open.

The control circuit may also be set up to selectively switch the electrical appliance to a third mode of operation in which the input circuit electrically isolates the at least one switched-mode converter from the mains input, wherein the electrical appliance has at least one internal power source set up to supply the control circuit at least intermittently with operating power in the third mode of operation. By providing a third mode of operation in which the switched-mode converter of the electrical appliance is fully isolated from the power supply system, it is possible to avoid power consumption by the appliance from a power supply system completely, with the supply of power to the control circuit by a power source allowing the electrical appliance to be switched on again electronically.

The electrical appliance may comprise a main converter and an auxiliary converter, wherein in the first mode of operation the main converter and in the second mode of operation the auxiliary converter is operated to produce an operating voltage for the electrical appliance. The use of different converter circuits for the first and second modes of operation allows optimum customization of the respective converters to the mode of operation and, hence, efficient operation of the electronic appliance in each mode of operation.

Our input circuits and devices are described below using different examples with reference to the Drawings. In the Drawings, the same reference symbols are used for functional elements which have the same or a similar function.

FIG. 1 shows a schematic illustration of an electrical appliance 2 comprising an input circuit 1. By way of example, the electrical appliance 2 may be a portable computer having an external switched-mode power supply unit or may be a fixed consumer electronics appliance having an internal power supply circuit.

In the example shown, the input circuit 1 comprises a mains input 3 to connect the electrical appliance 2 to a power supply system. In the direction of energy flow downstream of the mains input 3, a shared electrical path 18 contains a first mains filter 4 which keeps away interference caused by the electrical appliance 2 from the power supply system or interference transmitted via the power supply system from the electrical appliance 2.

Arranged downstream of the first mains filter 1 is a first switching element 5. The first switching element 5 permits selection of a first electrical path 6 and/or of a second electrical path 7 to supply power to the electrical appliance 2. Hence, there are two different electrical paths available to supply an operating voltage to the electrical appliance 2, the electrical paths being able to be selected on the basis of a selected mode of operation of the electrical appliance 2 to customize the input circuit 1 to suit the selected mode of operation.

The first electrical path 6 contains a second mains filter 8 and a main converter 9. If the first electrical path 6 is connected to the mains input 3 by the switching element 5, the mains voltage provided by the mains input 3 is filtered by the first mains filter 4 and the second mains filter 8 and is provided at a first supply output 10 of the input circuit 1. The supply output 10 connects to the main converter 9. In this case, the main converter 9 produces a supply voltage to operate the electrical appliance 2 in a first mode of operation.

The second electrical path 7 contains an auxiliary converter 11. If the switching element 5 is actuated such that the first electrical path 6 is isolated, a current flows via the second electrical path 7 and a second supply output 12 of the input circuit 1 to the auxiliary converter 11. The auxiliary converter 11 produces an auxiliary voltage to operate the electrical appliance 2 in a second mode of operation.

The supply and auxiliary voltages from the main converter 9 and the auxiliary converter 11, respectively, can be supplied to the same or different component(s) 13 of the electrical appliance 2. There may also be a shared converter provided which can be operated in modes of operation with different power consumption. By way of example, a switched-mode converter with optional power factor correction may be provided, wherein the power factor correction is activated in a first mode of operation with a power of more than 75 W and is deactivated in a second mode of operation with a power of less than 75 W. Alternatively, it is also possible to connect the paths 6 and 7 downstream of the second mains filter 8 and connect a main converter 9 and an auxiliary converter 11 to the shared supply output 10 in parallel with one another. In this case, the main converter 9 can, by way of example, be deactivated by virtue of the power breaker thereof no longer being actuated in the second mode of operation with reduced power consumption.

Furthermore, the electrical appliance 2 has a control circuit 14. The control circuit 14 is used to actuate the switching element 5 via a control input 17. In the example shown in FIG. 1, the control circuit 14 is alternatively supplied with an operating voltage via the auxiliary converter 11 or the main converter 9. The input circuit 14 can also regulate the main converter 9 and/or the auxiliary converter 11.

Figure 3:
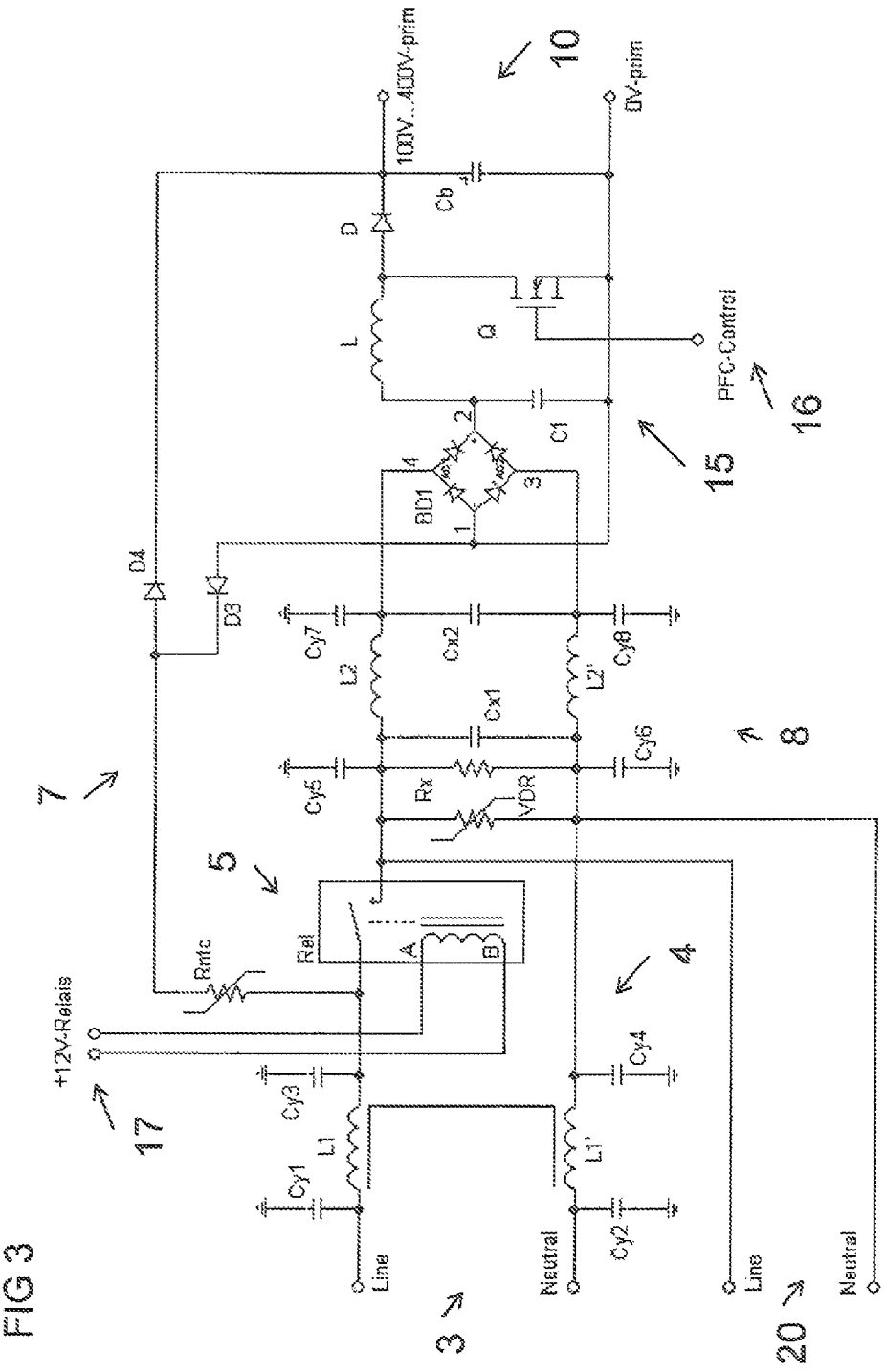
FIG. 3 shows a circuit diagram of an input circuit according to a first example.

FIG. 3 shows a circuit diagram of a selected example which is of relatively simple design. It essentially comprises a first passive mains filter 4 in the region of the mains input 3, a monostable relay Rel acting as a first switching element 5, a second passive mains filter 8, a bridge rectifier BD1, an active mains filter in the form of a circuit for power factor correction, subsequently PFC circuit 15, and a storage capacitor Cb. Connected in parallel with the first switching element 5, the second mains filter 8 and the PFC circuit 15 is a second electrical path 7 comprising a current limiting element Rntc and two diodes D3 and D4. The second electrical path can likewise be used to charge the storage capacitor Cb. The voltage across the storage capacitor Cb can be tapped off from the supply output 10 of the input circuit 1 to supply power to an electrical appliance 2. Both the main converter 9 and the auxiliary converter 11 are connected in parallel at the supply output 10 as a result of which they can be supplied with a primary DC voltage regardless of the selected path 6 or 7. This is not shown in FIG. 3 for reasons of clarity, however. Furthermore, a switching output 20 for an external peripheral device such as a monitor is provided electrically downstream of the relay Rel.

In the first mode of operation, called the "normal" mode of operation, the relay Rel is closed by providing a supply voltage at a control input 17 as a result of which a current flows from the mains input 3 via the first mains filter 4, the relay Rel, the second mains filter 8 to the PFC circuit 15 and from there to the storage capacitor Cb. The voltage across the storage capacitor Cb can be tapped off from the supply output 10 of the input circuit 1 to supply power to an electrical appliance 2. In this mode of operation, the supply current flows via the first electrical path 6 because the PFC circuit 15 charges the storage capacitor Cb to a voltage above the mains voltage as a result of which the diodes D3 and D4 are turned off. The first electrical path 6, in contrast to the second electrical path 7, has no current limiting element Rntc which means that the current limiting element Rntc also does not cause a power loss during normal operation. The relay Rel is therefore used not only to select the path 6 but also, at the same time, to short the current limiting element Rntc in the normal mode of operation. The use of a further switching element to deactivate the current limiting element Rntc after switch-on is therefore superfluous. The power provided by the PFC circuit 15 at the supply output 10 is relatively high in this first mode of operation. By way of example a power of 250 watts is provided.

The first filter 4, the second mains filter 8 and the PFC circuit 15 interact in this mode of operation to filter the interference caused by the electrical appliance 2, particularly a main converter 9 connected downstream of the input circuit 1. To this end, the second mains filter 8 has, in particular, two X capacitors Cx1 and Cx2 having relatively large dimensions with a capacitance of more than 100 nF. To comply with appropriate legal standards and for the purpose of electrical safety, a discharge resistor Rx and an overvoltage resistor VDR are provided which discharge residual charges present in the X capacitors Cx1 and Cx2 within a predefined period of time or prevent the overvoltages across the X capacitors Cx1 and Cx2, respectively. Furthermore, for a total power of more than 75 watts, it is prescribed that power factor correction be performed by correctly actuating a control connection 16 of the PFC circuit 15. Depending on any existing specifications relating to electrical dependability, individual components of the second mains filter 8 may also be arranged upstream of the first switching element 5. By way of example, instead of or in addition to the overvoltage resistor VDR, another overvoltage protection component may be provided directly at the mains input 3. Preferably, such components as cause no power loss in the state connected to the power supply system such as a gas discharge valve should be used in this case.

In a second mode of operation, called the "standby" mode of operation, the relay Rel is open and a supply current flows from the mains input 3 via the first mains filter 4, the current limiting element Rntc and diodes D3 and D4 downstream of the PFC circuit 15 to the storage capacitor Cb. During a positive half-cycle on the phase line Line, a current flows via the coil L1, the current limiting element Rntc, the diode D4 to the storage capacitor Cb and from there back via the bottom left-hand diode of the bridge rectifier BD1 between the connections 1 and 3, the coil L2' and the coil L1' to the neutral conductor Neutral. During a negative half-cycle on the phase line Line, a supply current flows from the neutral conductor Neutral via the inductor coil L1', the inductor coil L2', the bottom right-hand diode of the bridge rectifier BD1 between the connection 3 and 2, the inductor L and the diode D to the storage capacitor Cb and from there back via the diode D3, the current limiting element Rntc and the inductor coil L1 to the phase input Line. The second electrical path 7 is therefore used to produce the function of an ordinary bridge rectifier. The power provided by the input circuit 1 at the supply output 10 is relatively low in this second mode of operation. By way of example, a power of less than 5 watts, preferably less than 1 watt, is provided.

In this mode of operation, no current flows via the discharge resistor Rx of the second mains filter 8. The X capacitors Cx1 and Cx2 are not charged. Furthermore, the MOSFET capacitor Q of the PFC circuit 15 is not actuated via the control connection 16 for the power factor correction. Filtering is performed solely by the first passive mains filter 4 which has neither X capacitors nor a discharge resistor and, therefore, also causes no or only a minute power loss.

Figure 4:
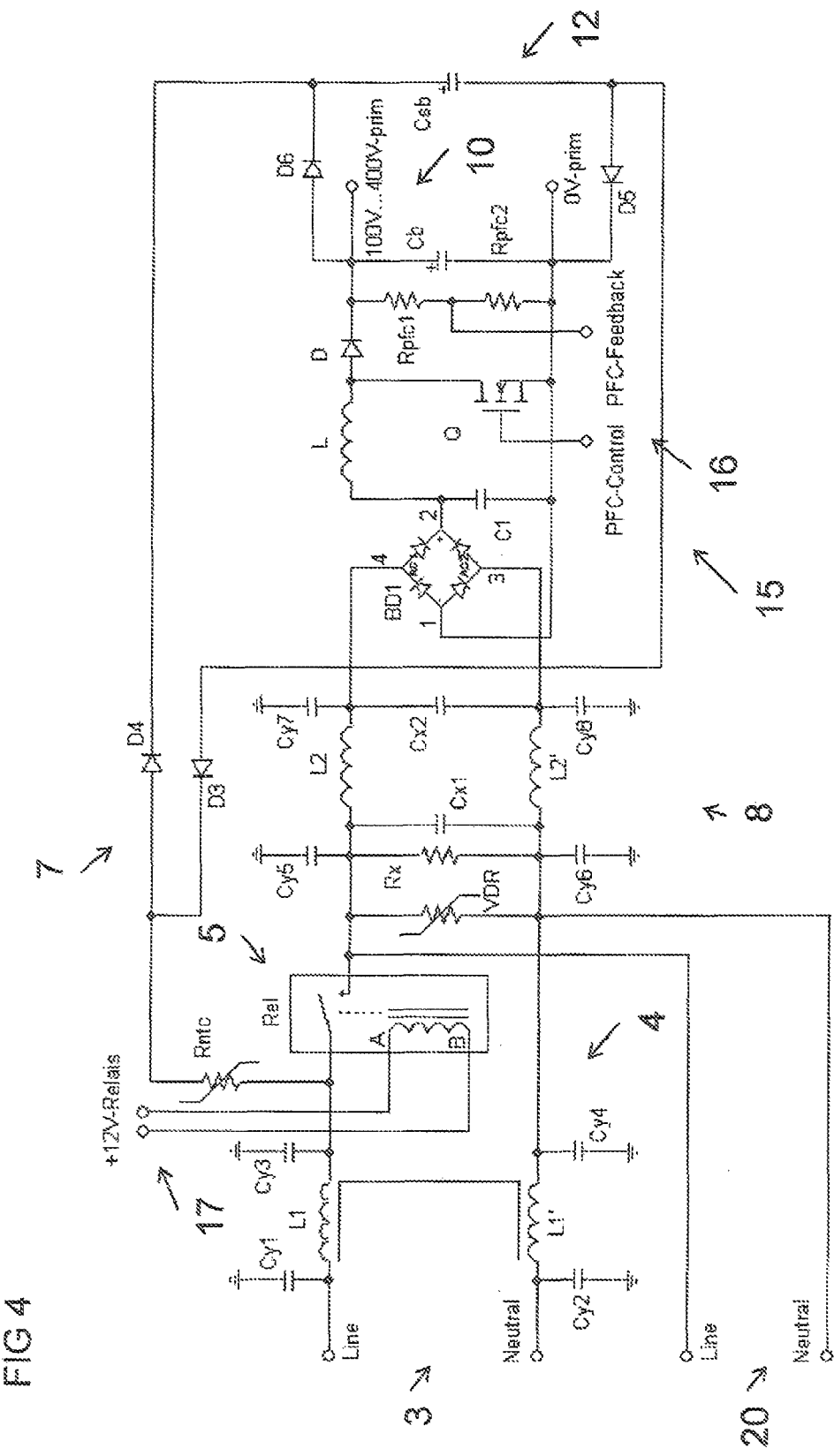
FIG. 4 shows a circuit diagram of an input circuit according to a second example.

FIG. 4 shows a second example of the input circuit 1. In comparison with the example shown in FIG. 3, the efficiency of the input circuit 1 shown in FIG. 4 has been increased further. The circuit arrangement shown in FIG. 4 largely matches the circuit arrangement shown in FIG. 3. In addition, an auxiliary capacitor Csb having smaller dimensions than the storage capacitor Cb has been provided in the region of the supply output 10. In the second standby mode of operation, the auxiliary capacitor Csb is charged via the second electrical path 7 to an operating voltage which can be tapped off from a second supply output 12.

The storage capacitor Cb which is also present is electrically decoupled from the auxiliary capacitor Cb by the additional diodes D5 and D6 in this mode of operation. Hence, the storage capacitor Cb is not charged in the second mode of operation. This eliminates the power loss in the resistors Rpfc1 and Rpfc2, shown symbolically in FIG. 4, which are necessary for providing a feedback signal PFC-feedback for the correction operation of the PFC circuit 15.

In the first mode of operation, that is to say when the relay Rel is closed, the storage capacitor Cb is charged via the second mains filter and the PFC circuit to an operating voltage provided at the first supply output 10. In addition, the diodes D6 and D5 are also used to charge the auxiliary capacitor Csb with an operating voltage as a result of which a supply voltage for an auxiliary power supply unit which may be connected downstream is also provided at the second supply output 12.

Figure 5:
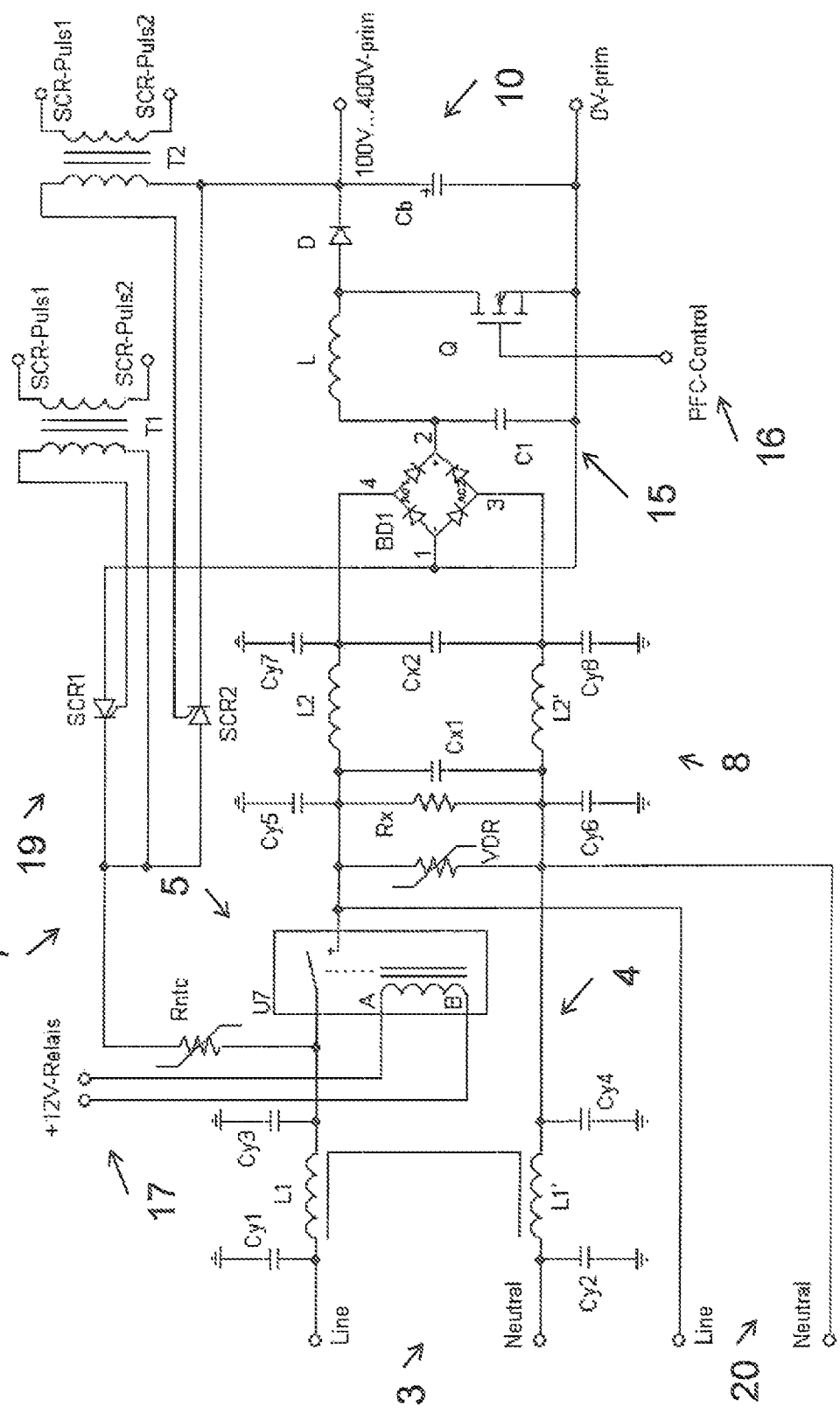
FIG. 5 shows a circuit diagram of an input circuit according to a third example.

FIG. 5 shows a further-improved input circuit 1 according to a third example. The input circuit shown in FIG. 5 again provides a first mains filter 4 in a shared electrical path 18, and a second mains filter 8 in a first electrical path 6. The first electrical path 6 can be decoupled from the mains input 3 by a relay Rel. The first electrical path 6 is designed in the manner of the first electrical path 6 according to the example shown in FIG. 3.

Furthermore, the input circuit 1 has a second electrical path 7 arranged in parallel with the relay Rel, the second mains filter 8 and the PFC circuit 15. In contrast to the examples shown in FIGS. 3 and 4, the second electrical path 7 has two thyristors SCR1 and SCR2 acting as a second switching element 19. The control inputs of the thyristors SCR1 and SCR2 are actuated by two transformers T1 and T2, respectively. The transformers T1 and T2 can be used to provide a suitable control pulse from a control circuit 14 in the electrical appliance 1 to trigger the thyristors SCR1 and SCR2 and, hence, allow the electrical appliance 2 to be supplied with power in a second mode of operation via the second electrical path 7.

If neither the relay Rel nor the thyristors SCR1 and SCR2 are actuated by suitable control signals, the supply output 10 of the input circuit 1 is completely electrically isolated from the mains input 3. Hence, no current flows through the input circuit 1 and the electrical appliance 2 is in a third mode of operation, called the "zero-watts" mode of operation. In this mode of operation, the first mains filter 4 alone is coupled to the mains input 3. Since the first mains filter 4 has neither an X capacitor nor a discharge resistor for an X capacitor, the first mains filter 4 does not draw electrical power from the power supply system in the zero-watts mode of operation.

Figure 6:
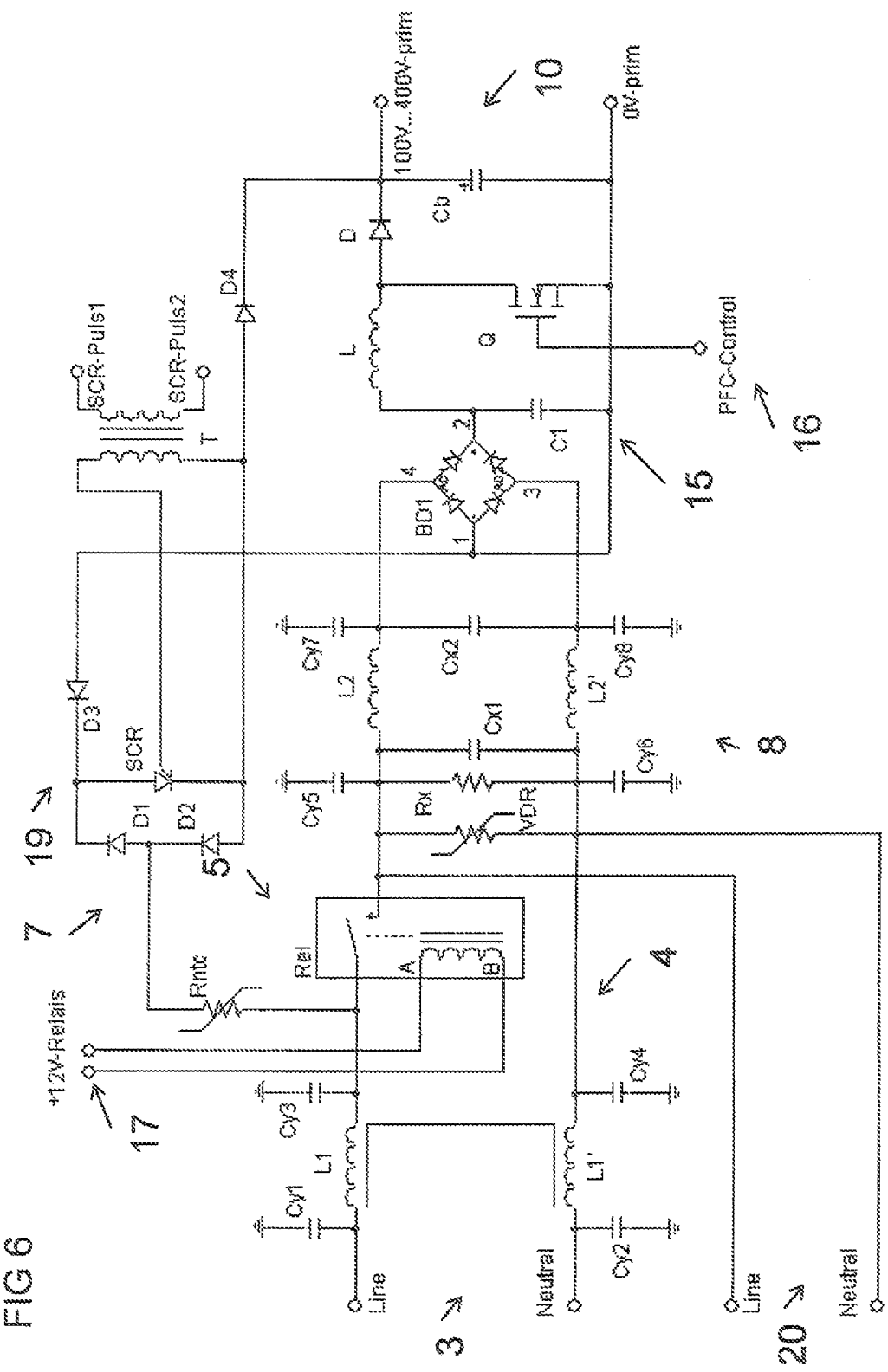
FIG. 6 shows a circuit diagram of an input circuit according to a fourth example.

FIG. 6 shows a fourth example of an input circuit 1. In comparison with the example shown in FIG. 5, actuation of the second switching element 19 has been simplified further. In this example, the second switching element 19 is just a single thyristor SCR. To be able to use the thyristor SCR both during a positive half-cycle and a negative half-cycle of the supply voltage at the mains input 3 to switch a flow current through the second electrical path 7, four diodes D1 to D4 are provided. During a positive half-cycle, an electric current flows from the phase line Line via the inductor coil L1, the current limiting resistor Rntc, the diode D1, the thyristor SCR and the diode D4 to the storage capacitor Cb. From there, the current flows via the bottom left-hand diode of the bridge rectifier BD1 between the connections 1 and 3, the inductor coil L2' and the inductor coil L1' back to the neutral conductor Neutral. During a negative half-cycle, an electric current flows from the neutral conductor Neutral via the inductor coil L1', the inductor coil L2', the bottom right-hand diode of the bridge rectifier BD1 between the connections 3 and 2, the storage coil L and the diode D to the storage capacitor Cb. From there, the current flows back via the diode D3, the thyristor SCR, the diode D2, the current limiting resistor Rntc and the inductor coil L1 to the phase line Line.

Since the circuit shown in FIG. 6 now contains only a single thyristor SCR as second switching element 19, a single transformer T also suffices for the actuation thereof. The actuation of the input circuit 1 is, therefore, simplified further in comparison with the circuit shown in FIG. 5.

Figure 7:
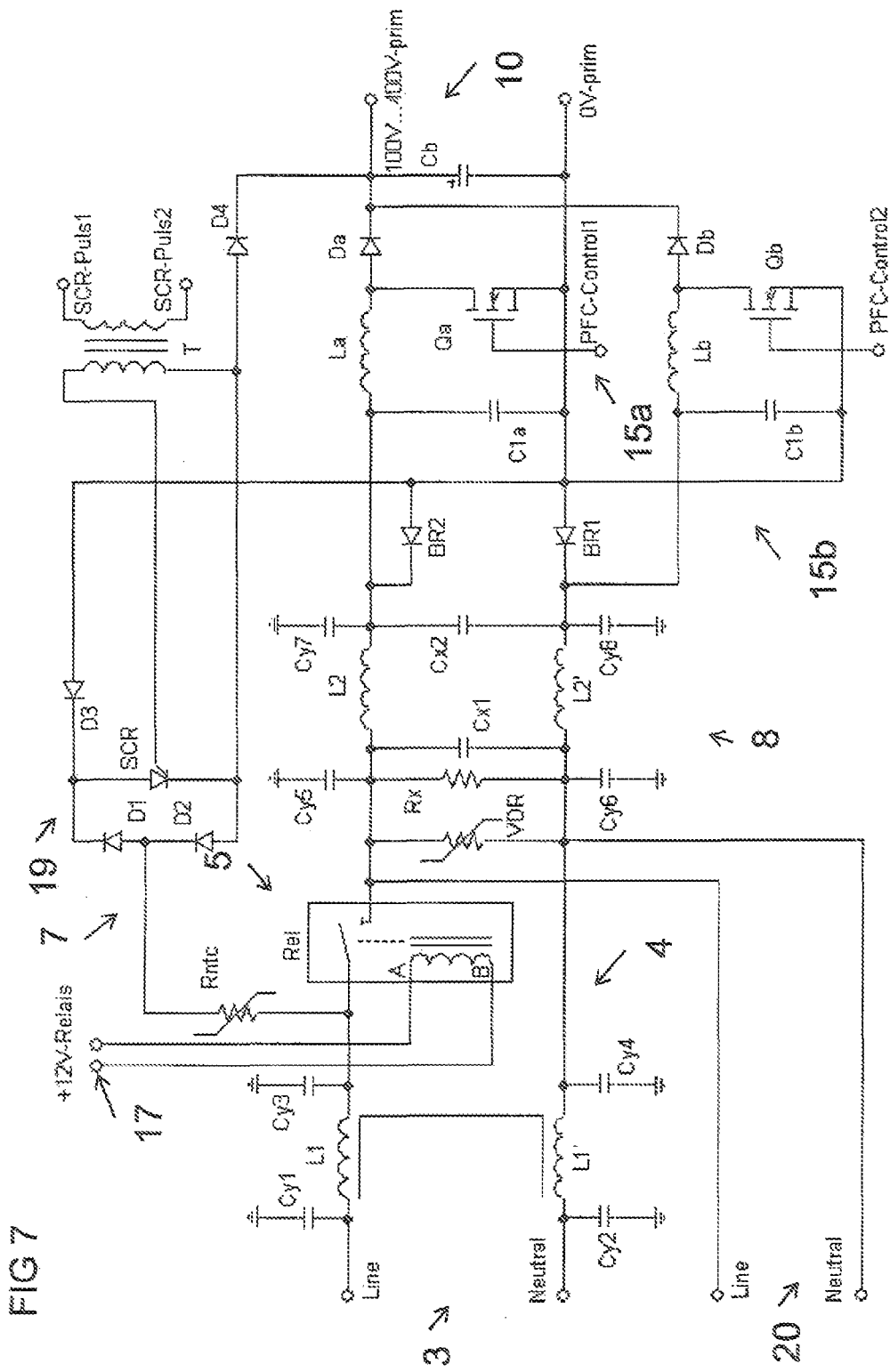
FIG. 7 shows a circuit diagram of an input circuit according to a fifth example.

FIG. 7 shows a fifth example of an input circuit 1. The input circuit largely corresponds to the example shown in FIG. 6. In particular, the shared electrical path 18 and the second electrical path 7 are designed in the same way. To bring about a further increase in efficiency of the input circuit 1 in the first mode of operation too, two PFC circuits 15a and 15b operating in parallel have been used instead of the bridge rectifier BD1 with a single downstream PFC circuit 15. The PFC circuits 15a and 15b are each a step-up converter (boost converter). However, it is also possible to use other known converter circuits with power factor correction.

With the relay Rel closed, the diode BR1 is on during a positive half-cycle of the mains voltage and the diode BR2 is on during a negative half-cycle. Hence, the first PFC circuit 15a is active during a positive half-cycle and the second PFC circuit 15b is active during a negative half-cycle. If the MOSFET Qa or Qb is turned on by applying a suitable control signal PFC-Control1 or PFC-Control2, the storage inductor La of the first PFC circuit 15a or the storage inductor Lb of the second PFC circuit 15b is charged. When the MOSFET Qa or Qb is off, the first storage inductor La is discharged via the diode Da or the second storage inductor Lb is discharged via the diode Db.

The circuit shown in FIG. 7 with parallel PFC circuits 15a and 15b for operation during a positive or negative half-cycle, respectively, of the supply voltage brings about a reduction in the power loss in the input circuit 1 in the first mode of operation. The reason is that the circuit shown in FIG. 7 no longer requires a bridge rectifier BD1 which means that the voltage is reduced only by one diode forward voltage during operation, whereas in the circuits according to the first to fourth examples two respective diode forward voltages drop across the bridge rectifier BD1.

FIG. 8 shows a combined state diagram and flowchart to actuate the input circuits 1 according to the different examples. The examples shown in FIGS. 3 and 4 without a second switching element 19 in the second electrical path 8 merely comprise the first operating state Z1 with a normal power consumption for the electrical appliance 2 and the second mode of operation Z2 with a reduced power consumption for the electrical appliance 2. The examples shown in FIGS. 5 to 7 with a second switching element 19 in the second electrical path 7 additionally comprise a third mode of operation Z3 in which the electrical appliance 2 is completely isolated from the power supply system. The additional mode of operation Z3 and steps 61 and 62 for changing to the second mode of operation Z2 are therefore shown in dashes in FIG. 8.

The combined state diagram and flowchart shown in FIG. 8 is described with reference to the circuit shown in FIG. 6. Initially, the electrical appliance 2 is in what is known as the zero-watts mode of operation Z3. In this state, neither the relay Rel nor the thyristor SCR has a control voltage applied to it, which means that the mains input 3 is electrically decoupled from the supply output 10. If the electrical appliance 2 is intended to be switched on or at least put into a standby mode of operation, a control pulse is provided for the transformer T via the connections SCR-Puls1 and SCR-Puls2. By way of example, a discrete control circuit, powered by what is known as a "BIOS" battery in a computer, or a battery-operated microcontroller with a particularly low power consumption can send a train of 20 single pulses to the transformer T within a period of 40 ms without requiring a mains voltage to do so. The transformer T transforms the control pulse provided to the necessary voltage to trigger the thyristor SCR in step 61.

When the thyristor SCR is triggered, a current flows—as described above with reference to FIG. 6—in the second electrical path 7 via the current limiting element Rntc to charge the storage capacitor Cb. In this case, the current limiting element Rntc limits an excessively rapid rise in the supply voltage and accompanying interference. When the capacitor Cb has been charged, an auxiliary converter 11 connected to the supply output 10, for example, starts in step 62. The thyristor SCR can subsequently be actuated with a higher pulse train, wherein power can be supplied via the auxiliary converter 11. The electrical appliance 2 is then in the second mode of operation Z2, denoted as standby operation with a greatly reduced power consumption.

If the appliance 2 is intended to be put into a normal mode of operation Z1, it is possible by way of example to provide a control voltage of 12 volts which is produced by an auxiliary converter 11 for the relay Rel via the control input 17. The first switching element 5 is then closed in step 63.

Within a defined period of time, a control signal is likewise provided to actuate the MOSFET Q in the PFC circuit 15. This is performed in step 64.

Next, in step 65, a main converter 9, which is likewise connected to the supply output 10, can be started, which draws a relatively high power from the power supply system via the first mains filter 4 and the second mains filter 8. In this case, the first mains filter 4, the second mains filter 8 and the circuit for power factor correction 15 ensure that the interference caused by the relatively powerful main converter 9 does not adversely affect the power supply system. When the main converter 9 has been started, the electrical appliance is in the first mode of operation Z1, called the "normal" mode.

In all of the circuits described above, it is possible for the first switching element 5 to be used to prompt not only isolation of the second mains filter 8 from the power supply system in the second mode of operation Z2, but also disconnection of a switching output 20 from the mains input 3. This allows a single relay Rel to be used to reduce both a power loss in the input circuit 1 of an electrical appliance 2 itself and a power loss in a peripheral device connected thereto, for example, a monitor or printer.

In an example which is not shown, a third mains filter is provided in the second electrical path 7. This is sometimes advantageous when the ratio between the first mains filter 4 in the shared electrical path 18 and the second mains filter 8 in the first electrical path 6 is chosen such that dimensioning the second mains filter 8 is sufficient to prevent electromagnetic interference from being emitted via a peripheral device connected to the switching output 20. For this purpose, the second mains filter 8 may possibly be enlarged and the first mains filter 4 reduced. If the first mains filter 4 is then no longer sufficient to suppress interference in the electrical appliance in the second mode of operation, the second electrical path 7 should be provided with a third mains filter, for example, a further coil. The coil in the second electrical path 7 carries only a relatively small current, for example, 100 mA, during operation and can have correspondingly thin coil windings.

A large number of further modifications to the input circuits 1 described above are possible. By way of example, instead of a first switching element 5 and a second switching element 19, it is possible to use a changeover relay. However, this has the drawback that complete decoupling of the supply output 10 from the mains input 3 and, hence, also a zero-watts mode of operation is then not possible. Furthermore, the dimensions of the storage capacitor Cb need to be chosen to be large enough to ensure that power is supplied to an auxiliary converter 11, connected downstream of the supply output 10, during the changeover period of the relay.

Furthermore, the positions of the shared electrical path 18 and the first and second electrical paths 6 and 7 arranged in parallel can be interchanged. From the point of view of the best possible electromagnetic interference suppression in the electrical appliance 2, however, it is advantageous to arrange the first mains filter 4 as close as possible to the mains input 3.

Furthermore, it is naturally possible to combine all of the features disclosed in the individual examples in almost arbitrary fashion. In particular, the arrangement of two parallel PFC circuits 15a and 15b which is shown in FIG. 7 can also be used in the other circuits shown in FIGS. 3 to 6.

The invention claimed is:

1. A switched-mode power supply unit comprising:
    a mains input that connects the power supply to a primary supply voltage;
    an input circuit comprising a shared electrical path connected to the mains input and extending from the mains input to an internal node, and comprising a first mains filter, a first electrical path, connected between the shared electrical path and at least one supply output of the input circuit and extending from the internal node to the supply output that provides a filtered primary input voltage, the first electrical path comprising a second mains filter and a first switching element that opens the first electrical path, the first switching element being arranged serially in the first electrical path, the input circuit further comprising a second electrical path connected between the shared electrical path and the at least one supply output of the input circuit and extending from the internal node to the supply output, the second electrical path connected in parallel with the first electrical path;
    at least one switched-mode converter having an input coupled to the at least one supply output of the input circuit that converts the filtered primary supply voltage to a secondary supply voltage; and
    a control circuit that selectively switches the power supply unit to a first mode of operation with a high power output or to second mode of operation with a reduced power output in comparison with the first mode of operation, wherein the control circuit actuates the input circuit such that in the first mode of operation the first switching element is closed as a result of which an operating current is filtered by the first mains filter and the second mains filter, and in the second mode of operation the first switching element is open as a result of which said operating current is filtered only by the first mains filter.

2. The unit according to claim 1, wherein the first mains filter comprises at least one Y-capacitor arranged between either a phase connection line or a neutral conductor and electrical ground.

3. An input circuit for an electrical appliance comprising:
    a mains input that connects the input circuit to a primary supply voltage;
    at least one supply output for providing a filtered primary input voltage;
    shared electrical path connected to the mains input and extending from the mains input to an internal node comprising a first mains filter;
    a first electrical path connected between the shared electrical path and the at least one supply output and extending from the internal node to the supply output, the first electrical path comprising a second mains filter;

a second electrical path connected between the shared electrical path and the at least one supply output and extending from the internal node to the supply output, the second electrical path being connected in parallel with the first electrical path and comprising a current limiting element;

a first switching element arranged serially in the first electrical path that opens the first electrical path; and a control input that actuates the first switching element by a control circuit, wherein the first switching element is closed in a first mode of operation with a high power consumption for the electrical appliance as a result of which an operating current is filtered by the first mains filter and the second mains filter, and is open in a second mode of operation with a reduced power consumption for the electrical appliance in comparison with the first mode of operation as a result of which said operating current is filtered only by the first mains filter.

4. The input circuit according to claim 3, wherein the first switching element is a monostable relay.

5. The input circuit according to claim 4, wherein the second electrical path contains a current limiting element.

6. The input circuit according to claim 3, wherein the input circuit comprises a second switching element that isolates the second electrical path, and the control circuit is set up to open both the first switching element and the second switching element in a third mode of operation as a result of which the input circuit is not used to provide an operating current for the electrical appliance.

7. The input circuit according to claim 6, wherein the second switching element is a semiconductor switching element.

8. The input circuit according to claim 7, wherein the semiconductor switching element is a thyristor.

9. The input circuit according to claim 3, wherein the first mains filter has no X capacitor or has an X capacitor having a capacitance of no more than 100 nF, and the second mains filter has an X capacitor having a capacitance of more than 100 nF.

10. The input circuit according to claim 3, comprising a circuit for power factor correction arranged in series with the second mains filter, and the control circuit activates the circuit for power factor correction in the first mode of operation and deactivates said circuit for power factor correction in the second mode of operation.

11. The input circuit according to claim 3, wherein the input circuit has a first storage capacitor having a first capacitance and a second storage capacitor having a second capacitance lower than the first capacitance to buffer a supply voltage for the electrical appliance, wherein the first storage capacitor is arranged in the first electrical path.

12. The input circuit according to claim 3, wherein the current limiting element is an NTC thermistor.

13. The input circuit according to claim 3, wherein the second mains filter is a passive mains filter.

14. The input circuit according to claim 3, wherein differently dimensioned mains filters are selected for different modes of operation of the electrical appliance, and the first and second mains filter are customized to demands of the first and second modes of operation of the electrical appliance.

15. An electrical appliance comprising;
a mains input that connects the electrical appliance to a power supply system;
an input circuit electrically coupled to the mains input, the input circuit comprising at least one supply output that provides a filtered primary input voltage; a shared electrical path connected to the mains input and extending from the mains input to an internal node comprising a first mains filter; a first electrical path connected between the shared electrical path and the at least one supply output and extending from the internal node to the supply output, the first electrical path comprising a second mains filter; a second electrical path connected between the shared electrical path and the at least one supply output and extending from the internal node to the supply output, the second electrical path connected in parallel with the first electrical path; and a first switching element that is arranged serially in the first electrical path and opens the first electrical path;
at least one switched-mode converter having an input coupled to the at least one supply input circuit to convert the filtered primary input voltage to a secondary supply voltage; and
a control circuit to selectively switch the electrical appliance to a first mode of operation with a high power consumption or a second mode of operation with a reduced power consumption in comparison with the first mode of operation, wherein the control circuit actuates the input circuit such that in the first mode of operation the first switching element is closed and in the second mode of operation the first switching element is open.

16. The electrical appliance according to claim 15, wherein the control circuit selectively switches the electrical appliance to a third mode of operation in which the input circuit electrically isolates the at least one switched-mode converter from the mains input, wherein the electrical appliance has at least one internal power source that supplies the control circuit at least intermittently with operating power in the third mode of operation.

17. The electrical appliance according to claim 16, wherein the electrical appliance comprises a main converter and an auxiliary converter, wherein in the first mode of operation the main converter and in the second mode of operation the auxiliary converter operates to produce an operating voltage for the electrical appliance.

18. The electrical appliance according to claim 15, wherein the electrical appliance comprises a main converter and an auxiliary converter, wherein in the first mode of operation the main converter and in the second mode of operation the auxiliary converter operates to produce an operating voltage for the electrical appliance.

19. The electrical appliance according to claim 15, wherein differently dimensioned mains filters are selected for different modes of operation of the electrical appliance, and the first and second mains filter are customized to demands of the first and second modes of operation of the electrical appliance.

* * * * *